(12) United States Patent
Rohrbaugh et al.

(10) Patent No.: US 6,846,512 B2
(45) Date of Patent: Jan. 25, 2005

(54) SYSTEM AND METHOD FOR CLEANING AND/OR TREATING VEHICLES AND THE SURFACES OF OTHER OBJECTS

(75) Inventors: Robert Henry Rohrbaugh, Hamilton, OH (US); Alan Scott Goldstein, Blue Ash, OH (US); Michael Ray McDonald, Middletown, OH (US); Helen Frances O'Connor, Loveland, OH (US); Morgan Thomas Leahy, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 237 days.

(21) Appl. No.: 09/950,757

(22) Filed: Sep. 11, 2001

(65) Prior Publication Data

US 2002/0102359 A1 Aug. 1, 2002

Related U.S. Application Data

(63) Continuation-in-part of application No. 09/875,311, filed as application No. PCT/US00/16349 on Jun. 14, 2000, and a continuation-in-part of application No. 09/876,363, filed on Jun. 7, 2001, and a continuation-in-part of application No. 09/828,014, filed on Apr. 6, 2001.

(51) Int. Cl.⁷ .............................. B05D 1/02; B05D 1/36; B05D 5/00
(52) U.S. Cl. .................... 427/201; 427/202; 427/372.2; 427/427
(58) Field of Search ................................ 427/201, 202, 427/372.2, 407.1, 409; 134/1, 4; 510/108

(56) References Cited

U.S. PATENT DOCUMENTS

| | | | |
|---|---|---|---|
| 3,909,437 A | * 9/1975 | Alexander et al. | 510/271 |
| 4,093,418 A | * 6/1978 | Compton et al. | 8/142 |
| 4,178,262 A | * 12/1979 | Compton et al. | 510/283 |
| 4,591,449 A | 5/1986 | Goedhart et al. | |
| 4,597,886 A | 7/1986 | Goedhart et al. | |
| 5,429,867 A | 7/1995 | McCarthy et al. | |
| 5,698,046 A | * 12/1997 | St. Laurent et al. | 134/25.2 |
| 5,853,809 A | 12/1998 | Campbell et al. | |
| 6,013,372 A | 1/2000 | Hayakawa et al. | |
| 6,225,434 B1 | 5/2001 | Sadvary et al. | |
| 6,455,162 B1 | 9/2002 | Pier | |
| 6,562,142 B2 | * 5/2003 | Barger et al. | 134/6 |
| 2002/0028288 A1 | 3/2002 | Rohrbaugh et al. | |
| 2002/0045010 A1 | 4/2002 | Rohrbaugh et al. | |
| 2002/0160224 A1 | 10/2002 | Barger et al. | |
| 2002/0176982 A1 | 11/2002 | Rohrbaugh et al. | |

FOREIGN PATENT DOCUMENTS

| | | | |
|---|---|---|---|
| CA | 2323022 | 4/2001 | |
| EP | 368101 | 5/1990 | |
| EP | 0368 101 B1 | 1/1994 | |
| GB | 1376379 | 12/1974 | |
| GB | 2 303373 A | 2/1997 | |
| GB | 2 316 687 A | * 3/1998 | ........... C03C/17/25 |
| JP | 03-169540 | 7/1991 | |
| JP | 04-353438 | 12/1992 | |
| JP | 08-053558 A | 2/1996 | |
| JP | 11-010077 A | * 1/1999 | ............ B05D/7/14 |
| WO | WO 99/00457 A1 | 1/1999 | |
| WO | WO 01/32820 A1 | 5/2001 | |

OTHER PUBLICATIONS

Laporte Industries, Inc., date of publication unknown but may before date of application, Leicestershire, UIK.

* cited by examiner

*Primary Examiner*—Shrive P. Beck
*Assistant Examiner*—William Phillip Fletcher, III
(74) *Attorney, Agent, or Firm*—Laura R. Grunzinger; Kim William Zerby; Steven W. Miller

(57) ABSTRACT

The present invention relates to a system and method for cleaning and/or treating a surface, preferably surfaces such as ceramic, steel, plastic, glass and/or painted surfaces such as the exterior surface of a vehicle. In one embodiment, the method forms a transparent, hydrophilic coating on the surface of a vehicle. This embodiment of the method includes the steps of: (a) providing a vehicle having at least some surfaces that are at least one of the following: cured painted surfaces, cured clearcoat surfaces, and glass surfaces; (b) applying a non-photoactive nanoparticle coating composition to such surfaces; and (c) allowing the coating composition to dry on such surfaces before the surfaces are contacted by water.

18 Claims, 3 Drawing Sheets

SYSTEM AND METHOD FOR CLEANING AND/OR TREATING VEHICLES AND THE SURFACES OF OTHER OBJECTS

CROSS REFERENCE TO RELATED APPLICATIONS

The application is a continuation-in-part of U.S. application Ser. No. 09/875,311, filed on Jun. 6, 2001, which claims the benefit of the filing date of PCT international patent application PCT/US00/16349 filed on Jun. 14, 2000; U.S. patent application Ser. No. 09/876,363, filed on Jun. 7,2001, which claims the benefit of the filing date of provisional U.S. Patent application No. 60/265,059, filed on Jan. 30, 2001; and U.S. patent application Ser. No. 09/828,014 filed on Apr. 6, 2001.

FIELD OF THE INVENTION

The present invention relates to a system and method for cleaning and/or treating surfaces, preferably surfaces such as ceramic, steel, plastic, glass and/or painted surfaces such as the exterior surface of a vehicle.

BACKGROUND OF THE INVENTION

Products for cleaning hard surfaces are widely available on the market. These products are used for two purposes, the first being to clean soil from the surface and the second being to leave the surface with an aesthetically pleasing finish e.g. spot-free or shiny. However, products available on the market often require rinsing with water after use. Typically when the water dries from the surface water-marks, smears or spots are left behind. These water-marks, it is believed may be due to the evaporation of water from the surface leaving behind deposits of minerals which were present as dissolved solids in the water, for example calcium, magnesium and sodium ions and salts thereof or may be deposits of water-carried soils, or even remnants from a cleaning product, for example soap scum. This problem is often exacerbated by some cleaning compositions which modify the surface during the cleaning process in such a way that after rinsing, water forms discrete droplets or beads on the surface instead of draining off. These droplets or beads dry to leave consumer noticeable spots or marks known as water-marks. This problem is particularly apparent when cleaning ceramic, steel, plastic, glass or painted surfaces. A means of solving this problem, known in the art is to dry the water from the surface using a cloth or chamois before the water-marks form. However, this drying process is time consuming and requires considerable physical effort.

U.S. Pat. No. 5,759,980 (Blue Coral) describes a composition for cleaning cars which is described to eliminate the problem of water-marks. The composition described comprises a surfactant package comprising a silicone-based surfactant and a polymer which is capable of bonding to a surface to make it hydrophilic. However, it is believed that the polymers described in this document may tend to be removed from the surface during rinsing of the product from the surface. Hence since the surface hydrophilicity is allegedly provided by the composition as described in the patent and the composition may be removed from the surface after the first rinse, the alleged hydrophilicity is also removed. The result is that the benefit provided by the composition is lost when the surface is rinsed.

DE-A-21 61 591 also describes a composition for cleaning cars wherein the surface is made hydrophilic by application of animo-group containing copolymers such as polyermic ethyleneimines, polymeric dimethyl aminoethylacrylate or methacrylate or mixed polymerisates. However, as with the composition described above the polymers are also believed to be rinsed off in the first rinse of the car, thereby removing any benefit the polymers could have provided.

PCT Publication WO 97/48927 is directed to a cleaning composition, method, and apparatus for cleaning exterior windows. This publication states that it discloses a no scrub/no wipe method for cleaning exterior windows without filming or spotting. A spray gun comprising separate chambers for a cleaning composition and an ion exchange resin is disclosed. The method involves spraying a cleaning composition on the window surface, preparing purified rinse water by passing the rinse water through the ion exchange resin and rinsing the window surface with the purified rinse water.

In addition to cleaning such surfaces, it is desirable to leave these surfaces with a clean finish that lasts for a reasonable period of time. Even though such surfaces are left with a spot-free finish, when the surfaces are contacted with water, such as rainwater, in the case of surfaces exposed to outside elements, or tap water for interior surfaces, these surfaces quickly lose their spot-free finish due to the same factors that cause spotting (dirt, deposits of minerals which were present as dissolved solids in the water, and the like) when the surfaces are originally cleaned. There are a number of waxes and other products in the market for attempting to retain this spot-free finish. Typically, these products are designed to hydrophobically modify these surfaces so that rain water and tap water will bead up on such surfaces. However, it is believed that the beading of water on such surfaces may actually increase the formation of water spots since the beads of water will leave deposits on the surface when they dry.

Thus, there is a need to provide a process of cleaning a surface without the appearance of water-marks, even after the treated surface is later contacted with water.

SUMMARY OF THE INVENTION

The present invention relates to a system and method for cleaning and/or treating surfaces, preferably surfaces such as ceramic, steel, plastic, glass and/or painted surfaces such as the exterior surface of a vehicle.

In one non-limiting embodiment, the method comprises a method for cleaning and treating a surface of a vehicle, comprising the steps of:

(a) applying a cleaning solution to the surface of a vehicle;

(b) optionally contacting the surface of the vehicle with the cleaning solution thereon and agitating the cleaning solution to loosen dirt on the surface of the vehicle;

(c) rinsing the surface of the vehicle to remove at least some of the cleaning solution;

(d) at least partially removing any residue-forming substances remaining on the surface of the vehicle, if any residue-forming substances remain on the surface of the vehicle;

(e) applying a treating composition to the surface of the vehicle, said treating composition comprising an effective amount of non-photoactive nanoparticles and preferably a wetting agent; and (f) allowing the treating composition to dry on the surface of the vehicle before the surface of the vehicle is contacted by water.

The present invention is not limited to methods for both cleaning and treating such surfaces. For instance, in another non-limiting example, the method can comprise only the steps of treating the surface, if desired. Treating the surface preferably results in the formation of a generally uniform, transparent, hydrophilic coating on the surface. Any portions of the method described herein may comprise inventions in their own right without regard to the other steps described herein. The present invention may also include a coating composition and a surface coated with such a coating composition.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I. Introduction

The present invention relates to a system and method for cleaning and/or treating surfaces, preferably surfaces such as ceramic, steel, plastic, glass and/or painted surfaces such as the exterior surface of a vehicle.

The term "surface" includes those surfaces typically found in houses like kitchens and bathrooms, e.g., floors, walls, tiles, windows, sinks, baths, showers, toilets, fixtures and fittings made of different materials like ceramic, porcelain, enamel, and vinyl, no-wax vinyl, linoleum, melamine, glass, any plastics, plastified wood, metal, especially steel and chrome metal, varnished or sealed surfaces and especially, the exterior surfaces of a vehicle, e.g. painted, plastic or glass surfaces and finishing coats.

II. The Kit

Figure 1:
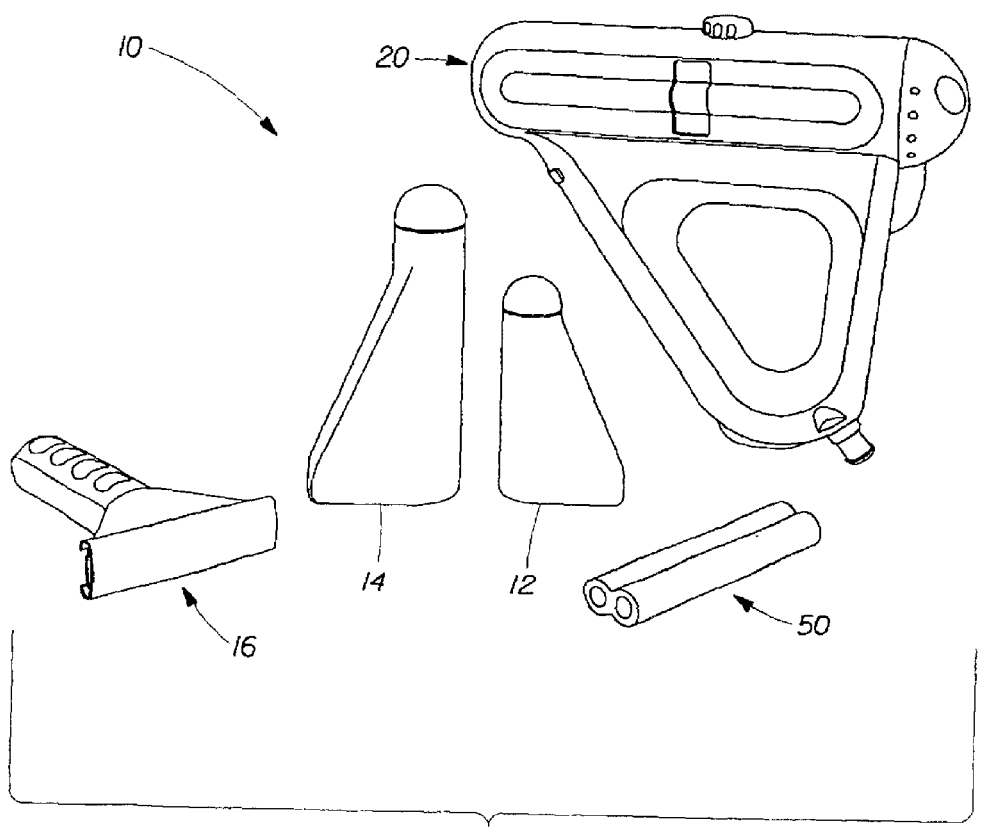
FIG. 1 is a perspective view of one non-limiting embodiment of the components of a kit for carrying out the method of the present invention.

FIG. 1 shows one non-limiting embodiment of a kit 10 for carrying out the method of the present invention. As shown in FIG. 1, the components of the kit 10 may comprise: a bottle of cleaning composition 12, a bottle of treating composition (which also may be referred to as a "finishing composition" or "coating composition") 14, an applicator 16, a spray device 20, and a filter 50 for the spray device. It should be understood that the components of the kit 10 shown in FIG. 1 are only one example of such a kit, and other kits could comprise fewer, or more components, or different components. For instance, in another non-limiting example, instead of being a squeegie as shown in FIG. 1, the applicator 16 could be a sponge, a rag, a cloth, a spray device, or other type of applicator.

A. The Cleaning Composition

The cleaning composition can be any suitable composition that is capable of cleaning the surface in issue. Preferably, the cleaning composition leaves the surface as free from residue as possible. In certain preferred embodiments, the cleaning composition is capable of rendering the surface hydrophilic. By the term "hydrophilic", it is meant that the surface has a high affinity for water. Because of the affinity between water and the surface, water spreads out on the surface to maximize contact. The higher the hydrophilicity, the greater the spread and the smaller the contact angle. Hydrophilicity can be determined by measuring the contact angle between the surface and a droplet of water on the surface. Contact angle is measured according to the American Standard Test Method for measuring contact angle, designation number D5725-95 using the apparatus commercially sold under the trade name Contact Angle Measuring System G10 by Kruss USA, Charlotte, N.C., USA.

In a preferred embodiment of the present invention, the surface after treatment with the cleaning composition has a contact angle of less than or equal to about 80°, or a contact angle less than or equal to any number of degrees less than 80° (all of which numbers are incorporated herein even though not specifically listed herein, for example, 40°, 30°, 20°, etc.) with the lower contact angles being more preferred.

In one non-limiting embodiment, the cleaning composition comprises a polymer which is capable of rendering the surface cleaned hydrophilic. The polymer should be a "surface substantive polymer" meaning that it is capable of modifying the surface by adhering or in some way associating with the surface to be cleaned such that it preferably remains on the surface during and after the cleaning process. Such adhesion or association may be for example by: covalent interaction; electrostatic interaction; hydrogen bonding; or van der waals forces. The polymer modifies the surface by rendering it hydrophilic. In a preferred version of such an embodiment, the polymer is preferably also capable of semi-durably modifying the surface to render it hydrophilic. By "semi-durably" it is meant that the hydrophilic surface modification is maintained for at least one rinse with water.

The polymer used in these embodiments of the cleaning composition may be a homo or copolymer. Preferably, the polymer comprises at least one hydrophobic or cationic moiety and at least one hydrophilic moiety. The hydrophobic moiety is preferably aromatic, C8–18 linear or branched carbon chain, vinyl imidazole or a propoxy group. Cationic moieties include any group that is positively charged or has a positive dipole. The hydrophilic moiety may be selected from any moiety that forms a dipole which is capable of hydrogen bonding. Suitable examples of such hydrophilic moieties include vinyl pyrrolidone, carboxylic acid, such as acrylic acid, methacrylic acid, maleic acid, and ethoxy groups.

In certain non-limiting embodiments of the invention, water soluble or water dispersible polymers are used in the cleaning composition to hydrophilically modify the surface. Water soluble polymers and copolymers may include those in which at least one segment or group of the polymer comprises functionality that serves to modify or enhance the hydrophilicity of the polymer or the adsorption of the polymer to the surface. Examples of the hydrophilizing segments or groups include: water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides, pyrrolidone, and polymers thereof; water soluble zwitterionic groups and polymers thereof; water soluble amides and polyamides; and water soluble polymers and copolymers of vinylimidazole and vinylpyrrolidone. Additionally, the water soluble polymer may include quaternized vinylpyrrolidone/dialkylaminoalkyl acrylate or methacrylate copolymers. Examples of the adsorption enhancing segment or group include but are not limited to the following: the segment or group of the polymer that comprises functionality that serves to modify or enhance the hydrophilicity, or segments or groups that include: aromatic, C8–18 linear or branched carbon chains, vinyl imidazole or a propoxy group, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butene oxide), poly(tetramethylene oxide), and poly(dodecyl glycidyl ether); and hydrophobic polyesters such as polycaprolactone and poly(3-hydroxycarboxylic acids).

In certain non-limiting, but preferred embodiments, the polymer is selected from the group consisting of copolymers of polyvinyl pyrrolidone. A particularly preferred copolymer of polyvinyl pyrrolidone is N-vinylimidazole N-vinylpyrrolidone (PVPVI) polymers available from for example BASF under the trade name LUVITEC™ VP155K18P. Preferred PVPVI polymers have an average molecular weight of from about 1,000 to about 5,000,000, more preferably from about 5,000 to about 2,000,000, even more preferably from about 5,000 to about 500,000 and most preferably from about 5,000 to about 15,000. Preferred PVPVI polymers comprise at least about 55%, preferably at least about 60% N-vinylimidazole monomers. Alternatively, another suitable polymer may be a quaternized PVPVI, for example, the compound sold under the tradename LUVITEC™ Quat 73 W by BASF.

Other suitable copolymers of vinylpyrrolidone for use in the cleaning composition are quaternized vinylpyrrolidone/dialkylaminoalkyl acrylate or methacrylate copolymers. The quaternized vinylpyrrolidone/dialkylaminoalkyl acrylate or methacrylate copolymers suitable for use in the cleaning composition have the following formula:

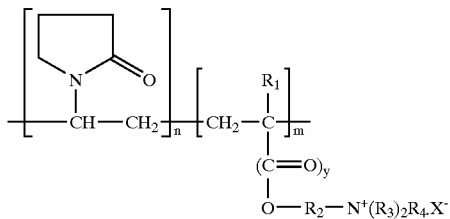

in which n is between 20 and 99 and preferably between 40 and 90 mol % and m is between 1 and 80 and preferably between 5 and 40 mol %; $R_1$ represents H or $CH_3$; y denotes 0 or 1; $R_2$ is —$CH_2$—CHOH—$CH_2$— or $C_xH_{2x}$, in which x=2 to 18; $R_3$ represents a lower alkyl group of from 1 to 4 carbon atoms, preferably methyl or ethyl, or

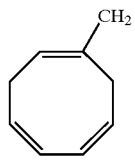

$R_4$ denotes a lower alkyl group of from 1 to 4 carbon atoms, preferably methyl or ethyl; $X^-$ is chosen from the group consisting of Cl, Br, I, $1/2SO_4$, $HSO_4$ and $CH_3SO_3$. The polymers can be prepared by the process described in French Pat. Nos. 2,077,143 and 2,393,573.

The preferred quaternized vinylpyrrolidone/dialkylaminoalkyl acrylate or methacrylate copolymers for use in the cleaning composition have a molecular weight of between about 1,000 and about 1,000,000, preferably between about 10,000 and about 500,000 and more preferably between about 10,000 and about 100,000. The average molecular weight range is determined by light scattering as described in Barth H. G. and Mays J. W. Chemical Analysis Vol 113, "Modern Methods of Polymer Characterization". Such vinylpyrrolidone/dialkylaminoalkyl acrylate or methacrylate copolymers, are commercially available under the name copolymer 845®, GAFQUAT 734®, or GAFQUAT 755® from ISP Corporation, New York, N.Y. and Montreal, Canada or from BASF under the tradename LUVIQUAT®. Also preferred herein are quaternized copolymers of vinyl pyrrolidone and dimethyl aminoethymethacrylate (polyquaternium-11) available from BASF. Another preferred polymer is polyvinyl pyridine N-oxide (PVNO) polymer available from, for example Reilly. Preferred PVNO polymers have an average molecular weight of about 1,000 to about 2,000,000, more preferably from about 5,000 to about 500,000, most preferably from about 15,000 to about 50,000. The polymer is preferably present in the cleaning composition at a level of from about 0.001% to about 10%, more preferably about 0.01% to about 5%, most preferably about 0.01% to about 1% by weight of the cleaning composition.

The cleaning composition may comprise a variety of optional ingredients depending on the desired benefit and the type of surface to be cleaned. Suitable optional ingredients for use herein can be selected from the group comprising: anti-resoiling ingredients, surfactants, clay, chelating agents, enzymes, hydrotopes, ions, suds control agents, solvents, buffers, thickening agents, radical scavengers, soil suspending polymers, pigments, dyes, preservatives and/or perfumes. Suitable ingredients for the cleaning compositions, particularly surfactants therefor, are described in U.S. Pat. No. 5,888,955, U.S. Pat. No. 6,172,021, and U.S. Pat. No. 6,281,181. The cleaning composition may (or may not) include other ingredients, such as those specified below for the treating composition (including, but not limited to nanoparticles).

The cleaning composition may be in any form, for example, liquid, gel, foam, particulate or tablet. When the cleaning composition is a liquid, it may be aqueous or non-aqueous, dilute or concentrated. When the cleaning composition is aqueous, it preferably comprises from about 1% to about 99.9% water, more preferably from about 50% to about 99.8%, most preferably from about 80% to about 99.7% water. As mentioned, it is alternatively envisaged that the cleaning composition may be non-aqueous. By "non-aqueous", it is meant that the cleaning composition is substantially free from water. More precisely, it is meant that the cleaning composition does not contain any expressly added water and thus the only water that is present in the composition is present as water of crystallization for example in combination with a raw material. When the composition is in solid form, e.g. particulate or tablet, it is preferably dissolved in water prior to use.

B. The Spray Device

Figure 2:
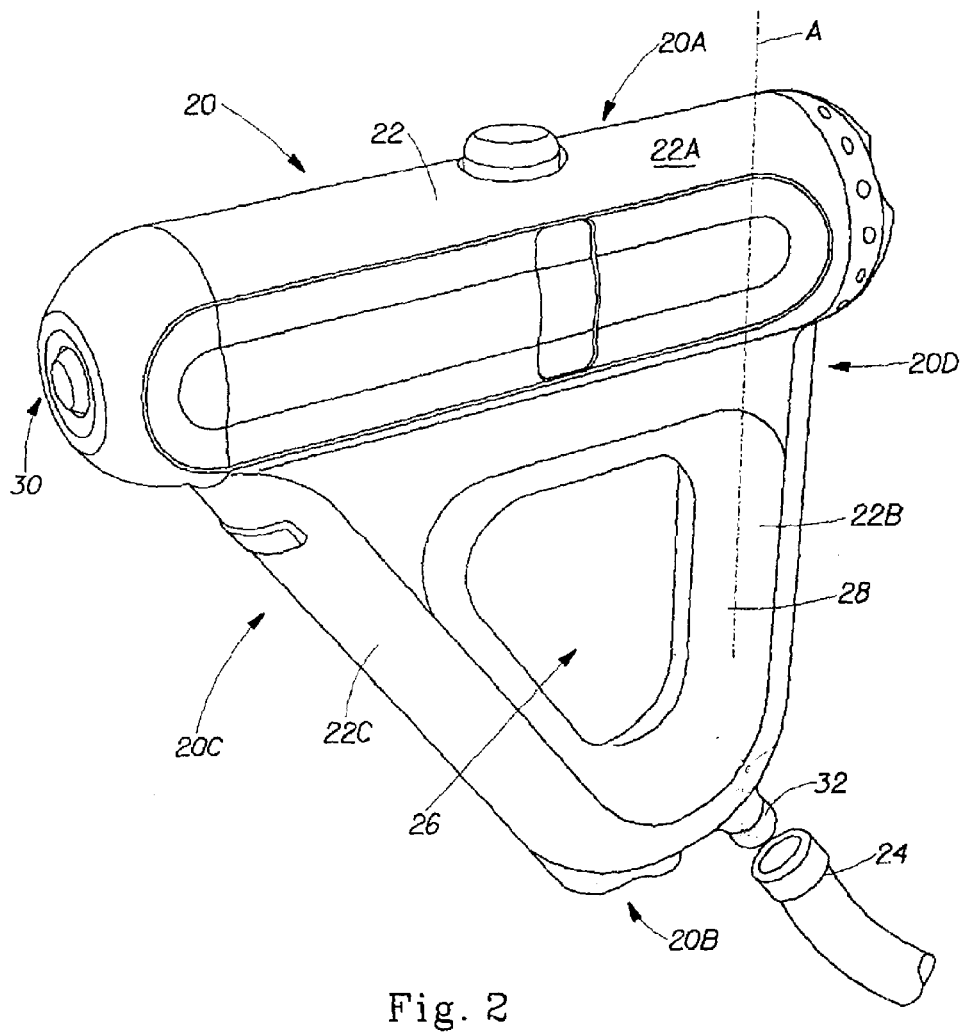
FIG. 2 is a perspective view of the sprayer shown in FIG. 1.

The spray device 20 can be in any suitable configuration. FIGS. 1 and 2 show one non-limiting embodiment of an ergonomically-designed, hand-held hose-end sprayer 20 that can be used in the system and method of the present invention. It should be understood that the system and method of the present invention are not limited to use with the embodiment of the sprayer shown in the drawings, and that many other types of sprayers, or other types of applicators, can be used.

In a preferred embodiment of the present invention, the cleaning composition is applied to the surface using a spray dispenser which is specifically designed to attach to a hose, for example conventional garden hose. Such spray dispensers are commonly referred to in the trade as Venturi or hose-end systems. The sprayer head includes an aperture over which water from the garden hose passes to mix with the cleaning composition from the container. In a preferred embodiment of the present process, the spray dispenser used encompasses a switch or valve system allowing the user to not only spray cleaning composition, but also spray water and/or purified rinse water to rinse the car. In a particularly preferred embodiment, the spray dispenser also comprises a purifying device, such as a filter. Water can, thus, be channeled though the purifying device to prepare the water for a final rinse of purified rinse water.

As shown in FIG. 1, this embodiment of the sprayer 20 has a generally triangular shape (and more particularly, a right triangular shape) when viewed from the side. FIG. 2 shows that the sprayer 20 has an upper portion 20A, an opposed lower portion 20B that is generally oriented toward the ground when the sprayer is in operation, a front portion 20C that is oriented toward the surface to be sprayed when the sprayer is in operation, and an opposed rear portion 20D.

The sprayer 20 comprises a housing or structure 22. The housing 22 has three portions: first portion 22A, second portion 22B, and third portion 22C that form the triangular shape. Preferably water flows through the housing 22 when the sprayer 20 is connected to a hose 24 and is in use. The housing 22 has a generally centrally located opening 26 and a handle 28 for gripping by a user. The handle has an axis, A. The sprayer further comprises at least one spray nozzle 30 that is operatively connected to the housing 22, and a hose connection (or simply "connection") 32 for the hose 24.

Figure 3:
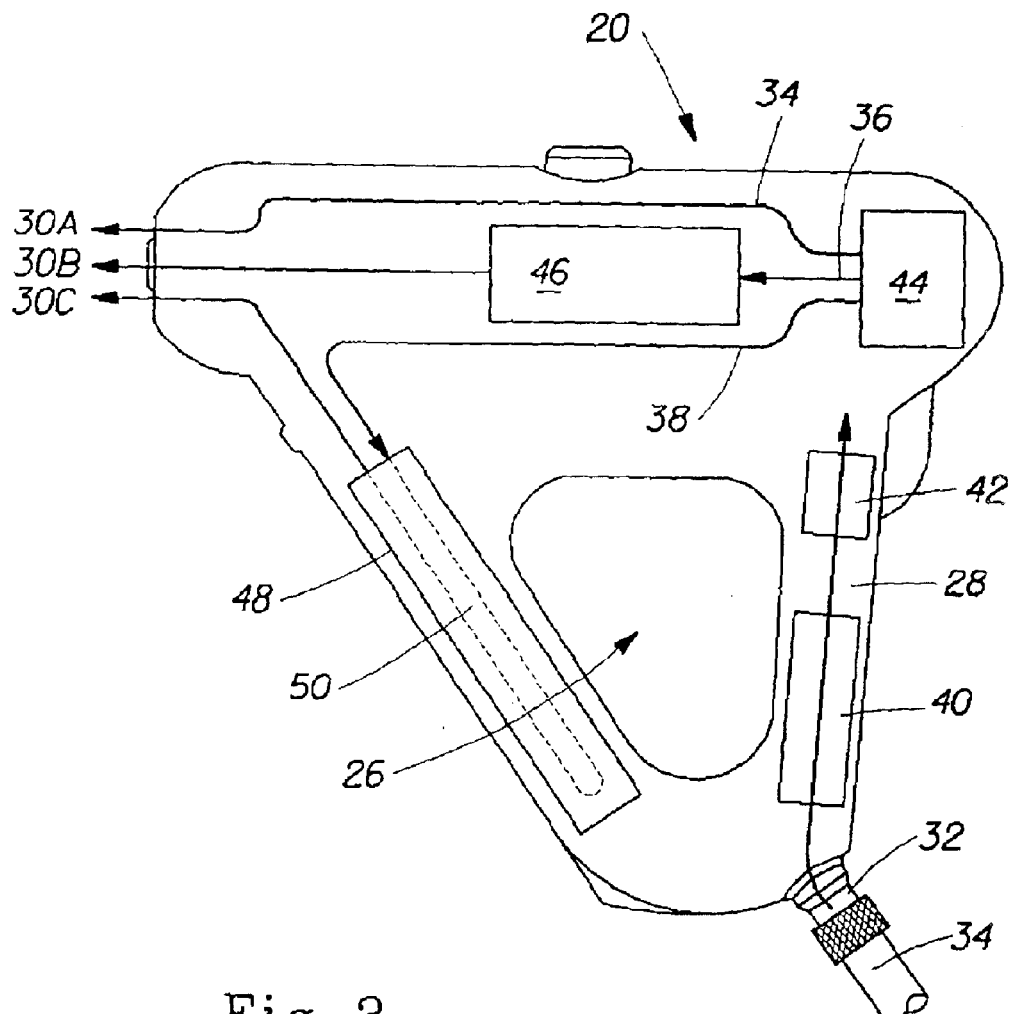
FIG. 3 is a schematic side view of the interior of the sprayer shown in FIG. 2.

FIG. 3 shows that in this embodiment, the sprayer 20 may also comprise one or more conduits (or flow channels or flow paths) through which water may flow. Preferably, in the embodiment shown, the sprayer housing 22 comprises three flow paths 34, 36, and 38. The sprayer 20 may also comprise a flow regulator 40, an on/off switch 42, a flow selector 44, a compartment 46 for a composition to be dispensed (such as the cleaning composition), a compartment 48 for a filter, and a filter 50. This embodiment of the sprayer 20 has three nozzles comprising first nozzle 30A, second nozzle 30B, and third nozzle 30C.

The flow selector of the sprayer 20 can have any suitable settings, and any suitable number of settings. For instance, in one non-limiting embodiment, the flow selector may have settings for one or more of the following: "wash", "normal rinse", "purified rinse", and "finish coat". Of course, the flow selector need not include all of these settings, and other suitable names can be used for any of these steps. The selector valve system comprises any system which allows the user to select different settings on the device. Preferably, the valve system is capable of facilitating the user's compliance with a defined wash and rinse process comprising at least a washing step, an unpurified water rinsing step and a purified water rinsing step.

As noted above, in other embodiments, other types of sprayers can be used instead of the sprayer described above. The spraying device may be manually or electrically powered. Manually operated spraying devices include trigger-operated spray dispenser or pump-operated spray dispenser. In these or other embodiments, additional sprayers can be used to carry out the method of the present invention. If more than one sprayer is used, the sprayers may be the same type of sprayer, or different types of sprayers. In still other embodiments, the method of the present invention can be carried without using a sprayer at all, and using some other type of application device instead, including but not limited to a sponge with soap in a bucket containing water.

Preferably, however, a sprayer is used. If a sprayer is used, one or more sprayers may be used to carry out one or more of the steps of: applying a cleaning solution to the surface of a vehicle; rinsing the surface of the vehicle to remove at least some of the cleaning solution; rinsing the surface of the vehicle with purifed rinse water; and, applying a treating composition to the surface of the vehicle. In one non-limiting embodiment, the sprayer described above is used for at least the steps of: applying a cleaning solution to the surface of a vehicle; rinsing the surface of the vehicle to remove at least some of the cleaning solution; and, rinsing the surface of the vehicle with purifed rinse water. In such an embodiment, a separate electric sprayer can be used to carry out the step of applying a treating composition to the surface of the vehicle.

1. The Filter

If a sprayer is used to provide purified rinse water, the sprayer may have a water purifier or filter that is used therewith. The filter can comprise any suitable type of filter, and any known filtering material. The filter can be permanent or replaceable. The filter can be in any suitable configuration. In one non-limiting embodiment, the filter can be of a type that is removeably attachable to the end of a garden hose. Preferably, however, in the embodiment of the kit 10 shown, the filter 50 is of a type that is incorporated into the sprayer 20. More specifically, the filter 50 is a replaceable filter that resides inside the third portion 22C of the housing. This filter 50 shown is a generally cylindrical filter, and more specifically is in the form of a structure comprised of two cylindrical portions that are joined together along their axes to form a compound cylindrical structure with a cross-section that resembles the figure "8". The filter 50 can be inserted into and removed from the sprayer housing 22 through an opening 54 in the lower portion 20B of the sprayer 20. In one non-limiting embodiment, the filter 50 comprises an ion exchange resin filter.

In one embodiment of an ion exchange resin filter, the purifying material is a mixture of several ion exchange resins or most preferably layers of different ion exchange resins. The ion exchange resin is selected from the group of strong acid cation (SAC), strong base anion (SBA), weak acid cation (WAC) and weak base anion (WBA) ion exchange resins. Strong acid or strong base ion exchange resins are those which comprise a strong acid or base functionality. A strong acid or strong base functionality are those which have a pKa or pKb, respectively, of higher than 2.5. A weak acid or base functionality is defined by a pKa or pKb, respectively, of less than 2.5. The purifying device may preferably comprise a random mixture of strong acidic and strong basic ion exchange resins. However, in one especially preferred embodiment, the purifying device comprises a sequential bed design of three different ion exchange resins, namely weak acidic, strong acid and weak basic and even more preferably in that order.

By "SAC ion exchange resin", it is meant a resin that filters all cations including calcium, magnesium and sodium. Examples of SAC ion exchange resins include, but are not limited to Rohm and Haas IRN77, 1500H and Purlite C100H. By "SBA ion exchange resin", it is meant a resin that filters all anions including sulfate, chloride, carbonate, bicarbonate and silicate. Examples of SBA, ion exchange resins include, but are not limited to Rohm and Haas 4400OH and Purlite A400OH. By "WAC ion exchange resin", it is meant a resin that selectively filters the hardness ion and other multi-valent and mono-valent cations associated with alkalinity. Examples of WAC ion exchange resins include, but are not limited to Rohm and Haas IRC86 and Purlite C104. By "WBA ion exchange resin", it is meant a resin that selectively filters strong acid anions such as sulfate and chloride. Examples of WBA ion exchange resins include, but are not limited to Rohm and Haas IRA67 and Purlite A830.

In a preferred embodiment, small particle size resin beads are used for higher ion exchange efficiency. By "small particle size resin beads", it is preferably meant beads of less than 1.0 mm in diameter, more preferably less than 0.6 mm and most preferably less than 0.4 mm in diameter. It is believed that small particle size resin beads provide improved efficiency due to the faster ion exchange kinetics of the smaller particle size resins. The faster kinetics results in greater utilization of the ion exchange capacity. In a further preferred embodiment the filter has a volume capacity of no greater than 100 in$^3$ and is suitable for use in a hand-held device. In a further preferred embodiment, the filter has a volume capacity of at least 4 in$^3$, more preferably at least 6 most preferably at least 8 in$^3$.

The purifying device preferably also comprises a visual indicator of depletion of purifying capacity. In a preferred embodiment, at least one type of resin in the purifying device which provides the visual indicator. In a particularly preferred embodiment, the visual indicator is provided by a change in color of a resin. Indicators generally used for acid/base titration can also be used to indicate the depletion of resin exchange capacity. Since many indicators themselves are ionic in nature, ion resins can be prepared in indicator form by treating them with 0.1% solution of the indicator in 95% ethanol. Typical indicators used include phenolphthalein, thymol blue and bromocresol green. The mechanism of the indicator color change on the resin is basically the same as the mechanism in a solution during an acid/base titration. The water trapped in the SAC matrix, for example, is very acidic by nature because of the hydrogen ions. As the hydrogen ions gets exchanged out, the pH slowly rises. Eventually this pH change triggers the color change. Thymol blue, for example, has a transition range between pH 1.2–2.8. Commercially available resins that change color upon exhaustion include Purolite MB400IND (blue regenerated, amber exhausted) and MB400QR (colorless regenerated, red exhausted). Many resin manufacturers will also dye the resins upon request for specific applications.

C. The Treating (Finishing/Coating) Composition

The treating (or finishing or coating) composition comprises a hard surface coating composition comprising a plurality of non-photoactive nanoparticles. The treating composition may be referred to as a finishing composition since it may be the last substance that is applied to the surface. It may also be referred to as a coating composition since it may be applied by coating the surface. Such a coating composition may comprise: (a) an effective amount of non-photoactive nanoparticles; (b) one or more surfactants; (c) optionally one or more adjunct ingredients; and (d) optionally a suitable carrier medium. The coating composition is preferably aqueous, and is substantially free from pigments and opacifiers, and no masking is applied to non-painted surfaces of the vehicles to which it is applied. It should be understood, however, that the coating composition is not limited to coating compositions that contain the ingredients listed above, and that suitable coating compositions may omit some of these ingredients, or contain additional ingredients (such as photoactive nanoparticles).

1. The Non-Photoactive Nanoparticles

Nanoparticles, defined as particles with diameters of about 400 nm or less, are technologically significant, since they are utilized to fabricate structures, coatings, and devices that have novel and useful properties due to the very small dimensions of their particulate constituents. "Non-photoactive" nanoparticles do not use UV or visible light to produce the desired effects. Nanoparticles can have many different particle shapes. Shapes of nanoparticles can include, but are not limited to spherical, parallelpiped-shaped, tube shaped, and disc or plate shaped.

Nanoparticles with particle sizes ranging from about 2 nm to about 400 nm can be economically produced. Particle size distributions of the nanoparticles may fall anywhere within the range from about 1 nm, or less, to less than about 400 nm, alternatively from about 2 nm to less than about 100 nm, and alternatively from about 2 nm to less than about 50 nm. For example, a layer synthetic silicate can have a mean particle size of about 25 nanometers while its particle size distribution can generally vary between about 10 nm to about 40 nm. Alternatively, nanoparticles can also include crystalline or amorphous particles with a particle size from about 1, or less, to about 100 nanometers, alternatively from about 2 to about 50 nanometers. Nanotubes can include structures up to 1 centimeter long, alternatively with a particle size from about 1 nanometer, or less, to about 50 nanometers.

Inorganic nanoparticles generally exist as oxides, silicates, carbonates and hydroxides. Some layered clay minerals and inorganic metal oxides can be examples of nanoparticles. The layered clay minerals suitable for use in the coating composition include those in the geological classes of the smectites, the kaolins, the illites, the chlorites, the attapulgites and the mixed layer clays. Smectites include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, penninite, donbassite, sudoite, pennine and clinochlore. Attapulgites include sepiolite and polygorskyte. Mixed layer clays include allevardite and vermiculitebiotite. Variants and isomorphic substitutions of these layered clay minerals offer unique applications.

The layered clay minerals suitable for use in the coating composition may be either naturally occurring or synthetic. An example of one embodiment of the coating composition uses natural or synthetic hectorites, montmorillonites and bentonites. Another embodiment uses the hectorites clays commercially available. Typical sources of commercial hectorites are LAPONITE™ from Southern Clay Products, Inc., U.S.A; Veegum Pro and Veegum F from R. T. Vanderbilt, U.S.A.; and the Barasyms, Macaloids and Propaloids from Baroid Division, National Read Comp., U.S.A.

The inorganic metal oxides used in the coating composition may be silica- or alumina-based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms, of alumina are commercially available in the form of Gibbsite, Diaspore, and Boehmite from manufacturers such as Condea.

Synthetic hectorites, such as LAPONITE RD™, do not contain any fluorine. An isomorphous substitution of the hydroxyl group with fluorine will produce synthetic clays referred to as sodium magnesium lithium fluorosilicates. These sodium magnesium lithium fluorosilicates, marketed as LAPONITE B™ and LAPONITE S™, contain fluoride ions of greater than 0% up to about 8%, and preferably about 6% by weight. LAPONITE B™ particles are flat disc-shaped, or plate shaped, and have a mean particle size of about 40 nanometers in diameter and about 1 nanometer in thickness. Another variant, called LAPONITE S™, contains about 6% of tetrasodium polyphosphate as an additive. In some instances, LAPONITE B™ by itself is believed, without wishing to be bound to any particular theory, to be capable of providing a more uniform coating (that is, more continuous, i.e., less openings in the way the coating forms after drying), and can provide a more substantive (or durable) coating than some of the other grades of LAPONITE™ by themselves (such as LAPONITE RD™).

The aspect ratio for disk shaped nanoparticles is the ratio of the diameter of the clay particle to that of the thickness of the clay particle. The aspect ratio of individual particles of LAPONITEB™ B is approximately 40 and the aspect ratio of individual particles of LAPONITE™ RD is approximately 25. A high aspect ratio is desirable for film formation of nanosized clay materials. More important to the invention is the aspect ratio of the dispersed particles in a suitable carrier medium, such as water. The aspect ratio of the particles in a dispersed medium can be considered to be lower where several of the disc shaped particles are stacked on top of one another than in the case of individual particles. The aspect ratio of dispersions can be adequately characterized by TEM (transmission electron microscopy). LAPONITE B™ occurs in dispersions as essentially single clay particles or stacks of two or fewer clay particles. The LAPONITE RD™ occurs essentially as stacks of two or more single clay particles. Thus, the aspect ratio of the particles dispersed in the carrier medium can be dramatically different from the aspect ratio of single disc-shaped particle. The aspect ratio of LAPONITE B™ is about 20–40 and the aspect ratio of LAPONITE RD™ is less than 15.

LAPONITE™ has the formula:

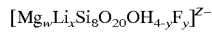

$$[Mg_wLi_xSi_8O_{20}OH_{4-y}F_y]^{z-}$$

wherein w=3 to 6, x=0 to 3, y=0 to 4, z=12−2w−x, and the overall negative lattice charge is balanced by counter-ions; and wherein the counter-ions are selected from the group consisting of selected $Na^+$, $K^+$, $NH_4^+$, $Cs^+$, $Li^+$, $Mg^{++}$, $Ca^{++}$, $Ba^{++}$, $N(CH_3)_4^+$ and mixtures thereof.

In some preferred embodiments, the nanoparticles will have a net excess charge on one of their dimensions. For instance, flat plate-shaped nanoparticles may have a positive charge on their flat surfaces, and a negative charge on their edges. Alternatively, such flat plate-shaped nanoparticles may have a negative charge on their flat surfaces and a positive charge on their edges. Preferably, the nanoparticles have an overall net negative charge. This is believed to aid in hydroplilizing the surface coated with the nanoparticles. The amount of charge, or "charge density", on the nanoparticles can be measured in terms of the mole ratio of magnesium oxide to lithium oxide in the nanoparticles. In preferred embodiments, the nanoparticles have a mole ratio of magnesium oxide to lithium oxide of less than or equal to about 11%.

Depending upon the application, the use of variants and isomorphous substitutions of LAPONITE™ provides great flexibility in engineering the desired properties of the coating composition used in the present invention. The individual platelets of LAPONITE™ are negatively charged on their faces and possess a high concentration of surface bound water. When applied to a hard surface, the hard surface is hydrophilically modified and exhibits surprising and significantly improved wetting and sheeting, quick drying, uniform drying, anti-spotting, anti-soil deposition, cleaner appearance, enhanced gloss, enhanced color, minor surface defect repair, improved smoothness, anti-hazing properties, modification of surface friction, reduced damage to abrasion and improved transparency properties. In addition, the LAPONITE™ modified surface exhibits "self-cleaning" properties (dirt removal via water rinsing, e.g. from rainwater) and/or soil release benefits (top layers are strippable via mild mechanical action).

In contrast to hydrophilic modification with organic polymers, the benefits provided by nanoparticles, such as LAPONITE™, either alone or in combination with a charged modifier, are longer lived. For example, sheeting/anti-spotting benefits are maintained on an automobile body and glass window after multiple rinses versus the duration of such benefits after only about one rinse with tap water or rainwater on a surface coated with hydrophilic polymer technology.

2. The Surfactant

Surfactants are especially useful in the coating composition as wetting agents to facilitate the dispersion of nanoparticles onto the surface. Surfactants are alternatively included when the coating composition is used to treat a hydrophobic hard surface or when the coating composition is applied with a spray dispenser in order to enhance the spray characteristics of the coating composition and allow the coating composition, including the nanoparticles, to distribute more evenly. The spreading of the coating composition can also allow it to dry faster, so that the treated surface is ready to use sooner. For concentrated compositions, the surfactant facilitates the dispersion of many adjunct ingredients such as antimicrobial actives and perfumes in the concentrated aqueous compositions. Suitable surfactants useful in the present invention are selected from the group consisting of anionic surfactants, cationic surfactants, nonionic surfactants, amphoteric surfactants, zwitterionic surfactants, and mixtures thereof.

When a surfactant is used in the coating composition, it is added at an effective amount to provide one, or more of the benefits described herein, typically from about 0.01% to about 5%, alternatively from about 0.01% to about 3%, alternatively from about 0.01% to about 0.5%, by weight of the coating composition.

The surfactant can be formulated to be compatible with the nanoparticle system, the carrier medium, and optional adjunct ingredients present in the coating composition. The surfactant can also be chosen to more effectively spread the nanoparticle coating composition on the suface and provide the surface with the desired benefits. In certain embodiments, this may mean that the surfactant is selected so that the static surface tension of the liquid-vapor interface for a 0.1% surfactant solution containing the surfactant and the vapor above such a solution is less than about 32 dynes/cm, preferably less than or equal to about 30 dynes/cm. In these embodiments, the surfactant is also preferably selected such that the critical micelle concentration (CMC) of the surfactant is less than or equal to about 650 ppm.

For the coating compositions used herein, this may also mean that the surfactants are of type that (as opposed to detersive surfactants) are low sudsing and low foaming (since it is generally undesirable for the coating to have suds or foam therein). Low foaming nonionic surfactants can be described in terms of their cloud point. Low foaming nonionic surfactants typically have a cloud point below about 30° C. Non-limiting descriptions of low cloud point non-ionic surfactants are, contained in U.S. Pat. Nos. 6,013,613 and 6,034,044. It should be understood, however, that surfactants can be useful in the coating composition even if they have cloud points above about 30° C. Preferred surfactants may have a cloud point of 40° C. or less, although surfactants having higher cloud points are not excluded. Amphoteric and anionic surfactants can be considered to be low sudsing and low foaming if they are present below a Kraft Temperature of about 30° C.

Examples of some suitable nonionic, anionic, cationic, ampholytic, zwitterionic and semi-polar nonionic surfactants are disclosed in U.S. Pat. Nos. 5,707,950 and 5,576,282, incorporated herein by reference.

In one non-limiting embodiment, the surfactant system comprises a nonionic surfactant. One such surfactant suitable for use in the coating composition comprises polyethylene oxide and polypropylene oxide condensates of primary and secondary aliphatic alcohols. These compounds include the condensation products of primary and secondary aliphatic alcohols having an alkyl group containing from about 6 to about 14 carbon atoms, preferably from about 8 to about 14 carbon atoms, in either a straight-chain or branched-chain configuration with the alkylene oxide. In a preferred embodiment, the nonionic surfactant is comprised of units of ethylene oxide and units of propylene oxide where amount of ethylene oxide is equal to from about 2 to about 25 moles, more preferably from about 3 to about 15 moles, of ethylene oxide per mole of primary and secondary aliphatic alcohol and the propylene oxide is equal to from about 2 to about 25 moles, more preferably from about 3 to about 15 moles, of propylene oxide per mole of primary and secondary aliphatic alcohols. Commercially available nonionic surfactants of this type include nonionic surfactants in the TERGITOL™ series, such as MINFOAM 1X™, an alkyloxy (polyethyleneoxypropylenoxy) isopropanol having the formula C12–14H25–29O(CH2CH2O)x{CH2CH2O/CH2CH(CH3)O}yCH2CH(CH3)OH and MINFOAM 2X™ available from Union Carbide Corporation, a subsidiary of The Dow Chemical Company, Danbury, Conn., USA.

3. Suitable Carrier Medium

The carrier medium can form part of the coating composition, or it can comprise the medium in which the nanoparticles are carried (or transported) for application to the surface.

Several non-limiting examples of types of carrier mediums are provided by way of explanation, and not by way of limitation. In one example, the coating composition can be provided in the form of an aqueous liquid in a container, and the liquid can be sprayed onto the surface. In such a case, the aqueous liquid carrier in the container holding the coating composition may be referred to herein as the "static carrier". When this coating composition is sprayed onto the surface, the liquid droplets in the spray may be referred to herein as the "dynamic carrier" (the medium that transports the nanoparticles to the surface in order to contact the surface). In another example, the coating composition may exist in a gel form in a container (the gel would be the form of the static carrier) and the gel could be diluted with water and sprayed as a liquid onto the surface (in which case the liquid spray would be the dynamic carrier). The term "carrier", as used herein, includes both static and dynamic carriers.

Suitable carrier mediums include liquids, solids and gases. One suitable carrier medium is water, which can be distilled, deionized, or tap water. Water is valuable due to its low cost, availability, safety, and compatibility. In certain embodiments in which the carrier medium is aqueous, it may be preferred that at least some of the aqueous carrier is purified beyond the treatment it received to convert it to tap water (that is, the tap water is post-treated, e.g., deionized or distilled). The purified water could comprise: all or part of the static carrier for the composition; all or part of the dynamic carrier; or, all or part of both. Other suitable carrier media include, but are not limited to solvents, including, but not limited to alcohol, methanol, isopropanol, and ethanol, with water, or without water.

D. The Applicator

The kit can comprise as an optional component, one or more applicators or implements. The applicator(s) or implement(s) can be used to carry out any of the steps of the process, including, but not limited to: (a) applying a cleaning solution to the surface of a vehicle; (b) optionally contacting the surface of the vehicle with the cleaning solution thereon and agitating the cleaning solution to loosen dirt on the surface of the vehicle; (c) rinsing the surface of the vehicle to remove at least some of the cleaning solution; (d) rinsing the surface of the vehicle with purifed rinse water; and (e) applying a treating composition to the surface of the vehicle.

The applicators or implements can comprise any type of applicator or implement known in the art, including, but not limited to: a sprayer, a sponge, a fabric or porous article, or a squeegie to name a few possible types of applicators and implements. All types and configurations of these applicators and implements can be used. In the embodiment of the kit shown in the drawings, the applicator comprises a squeegie of the type having a foam pad. In a preferred embodiment, the treating composition is applied to the surface to be treated using a sprayer. The sprayer can be any suitable type of sprayer. Such a sprayer can be a diluting type, or the treating composition can be previously diluted placed into the container of the sprayer. In one preferred embodiment, the sprayer is a Solo SPRAYSTAR™ electrical sprayer such as that distributed by Solo Incorporated of Newport News, Va., USA. In other embodiments, the applicator can comprise an air gun.

E. Instructions for Use

The kit may further comprise instructions for use. Such instructions for use may, for example, include instructions that instruct the user to spray on the treating composition using one pass with a sprayer. The instructions may further instruct the user to completely wet the surface of the surface without delaying the spray over any portion of the surface of the vehicle, or any other instructions necessary to form the desired coating.

III. The Method

In one non-limiting embodiment, the method comprises a method for cleaning and treating a surface of a vehicle. The term "vehicle", as used herein, includes any type of vehicle known, and includes, but is not limited to automobiles, trucks, trains, aircraft, and watercraft. It should be understood that the method described below is merely illustrative. The surfaces of vehicles are illustrated because they often include cured painted surfaces, cured clearcoat surfaces, and glass surfaces, and various combinations of these different types of surfaces. Such surfaces are often some of the most unforgiving types of surfaces from the standpoint of their tendency to be left with visible watermarks and other types of residue. Thus, if the present method works well on such surfaces, it will generally work well on the other types of surfaces specified herein. The present invention can be used to clean and treat many other types of surfaces other than the surfaces of vehicles. The present invention is also not limited to the steps of the method described herein. In this embodiment, the method comprises the following steps.

A. Applying the Cleaning Solution to the Surface of a Vehicle

The cleaning composition can be applied to the surface in any suitable manner. The cleaning composition can either be applied directly to the surface, with or without any other steps. In one non-limiting embodiment, however, the cleaning composition is applied to the surface after an optional pre-wetting step. The composition can be applied using a cloth or sponge onto which the composition has been applied, or by pouring the composition over the surface. Alternatively, the composition may be applied to the surface by spraying the composition onto the surface using a spraying device. In one non-limiting embodiment, a spraying device, such as; the sprayer shown in the drawings, is used to apply the cleaning composition to the surface of the vehicle.

B. Contacting the Surface of the Vehicle With the Cleaning Solution Thereon and Agitating the Cleaning Solution to Loosen Dirt on the Surface of the Vehicle The surface of the vehicle with the cleaning solution thereon can be contacted to agitate or scrub the cleaning solution to loosen dirt on the surface of the vehicle. This can be done in any manner known in the art. In one non-limiting embodiment, a sponge is used to wipe the surface of the vehicle and agitate the cleaning solution to loosen dirt on the surface of the vehicle.

C. Rinsing the Surface of the Vehicle to Remove at Least Some of the Cleaning Solution Once the cleaning composition has been applied to the surface, the surface is then rinsed. The surface of the vehicle rinsed to remove at least some, and preferably substantially all of the cleaning solution (other than any portion of the cleaning solution which is desirable to leave on the surface to provide a hydrophilic properties). The surface of the vehicle can be rinsed in any manner known in the art, including but not limited to by using a hose. In one non-limiting embodiment, the surface of the vehicle is rinsed using a spraying device, such as the sprayer shown in the drawings. The spraying device can be set on the "normal rinse" setting and rinsed with tap water. Preferably, however, during at least some stage of the method, purified rinse water is used to reduce any residue left by tap water.

D. At Least Partially Removing Any Residue-Forming Substances Remaining on the Surface of the Vehicle After the surface is washed and rinsed, any residue-forming substances remaining on the surface of the vehicle should be removed. Residue-forming substances include, but are not limited to: soap; any portion of the cleaning composition that will leave a residue, and is not intended to be left on the surface of the vehicle; and, dissolved solids that are left behind by rinsing the surface with tap water. The residue-forming substances can be removed in any suitable manner, including but not limited to towel-drying or forced air drying the surface of the vehicle and rinsing the surface of the vehicle with purified rinse water.

1. Towel-Drying or Forced Air-Drying the Surface of the Vehicle

The surface of the vehicle can be wiped dry (e.g., towel dried) or forced air dried in a conventional manner. Towel-drying, however, is labor intensive, and thus, may be less preferred. In a car wash, or other commercial version of the process, any tap water remaining on the surface of the vehicle, and its accompanying dissolved solids, can be removed by forced air drying of the surface of the vehicle. Forced air drying can also be adapted for a hand washing procedure.

2. Rinsing the Surface of the Vehicle with Purifed Rinse Water

Alternatively, and preferably, the residue-forming substances are removed from the surface of the vehicle by rinsing the surface of the vehicle with purified rinse water. By "purified rinse water", it is meant water from which any suspended and/or dissolved solids (cations and anions) and other contaminants (organic and inorganic) or impurities have been removed, preferably using a filtering process.

The final rinse of purified rinse water can be delivered by any suitable means but is preferably, for convenience, delivered to the surface using a hose-end spray device. In one non-limiting embodiment, the surface of the vehicle is rinsed using a spraying device, such as the sprayer shown in the drawings. The spraying device can be set on the "purified rinse" setting and rinsed with purified water. In order to reduce the amount of purified water needed and to reduce the amount of capacity of the filter required to purify the water, the majority of the cleaning composition is preferably rinsed from the surface using unpurified water and then subsequently the surface is finally rinsed with purified rinse water.

In certain embodiments, an unusual phenomena is seen when rinsing the surface of the vehicle with purified rinse water. During the step of rinsing the surface of the vehicle with purified rinse water, a large number (e.g., a plurality or multiplicity) of small air bubbles or water droplets (either of which may be referred to herein as "beads") appear on the surface of the vehicle. These air bubbles or water droplets continuously form over the entire surface of the vehicle which is contacted with the purified rinse water and continuously sheet off the surface during the step of rinsing the surface of the vehicle with purified rinse water.

A particular benefit of using purified rinse water in the process is that when the surface is cleaned and then rinsed using purified rinse water, there is no need to wipe the surface dry or to use forced air to dry the surface. The surface rinsed with purified rinse water will be substantially free of water spots or streaks. This makes the use of purified rinse water in the method particularly advantageous for hand washing vehicles, since it is much less labor-intensive and energy-intensive than towel drying and forced air drying, respectively.

E. Applying a Treating Composition Comprising an Effective Amount of Non-Photoactive Nanoparticles to the Surface of the Vehicle The treating (or coating) composition comprising the non-photoactive nanoparticles is then applied to the surface of the vehicle. The treating composition can be applied to the surface of the vehicle while the vehicle is still wet from the purified rinse water, or when the surface of the vehicle is dry. The treating composition can be applied to the surface of the vehicle in any suitable manner including, but not limited to pouring, wiping (such as with a sponge, cloth, or the like), and spraying.

In a preferred embodiment, the aqueous liquid treating composition comprising the non-photoactive nanoparticles should first be shaken to ensure that the nanoparticles are adequately dispersed in the solution before it is applied to the surface of the vehicle.

It has been found that the properties of the treating composition and the manner of applying the treating composition can have a considerable impact on the final appearance of the vehicle. It is not trivial to deliver a residue-free nanoparticle film that provides the desired hydrophilic surface modification. This is particularly true in the case of certain conditions. For example, hot weather conditions can cause the treating composition to partially dry before it spreads sufficiently to form the desired coating. Direct sunlight can also impact the coating formed. Wind can affect the coating by creating unevenness in the coating where the coating is disturbed by the wind. In addition, the manner of application such as the manner and amount of the coating composition that is applied can have a significant impact on the final appearance of the vehicle. It is, therefore, desirable to develop a treating composition that is not overly sensitive to these conditions, and to apply the treating composition in a manner that forms a residue-free nanoparticle film that provides the desired hydrophilic surface modification.

It has been found that when the treating composition comprises LAPONITE B™ nanoparticles, it is capable of providing a more uniform coating (that is, more continuous, i.e., less openings in the way the coating forms after drying), and can provide a more substantive (or durable) coating than some of the other grades of LAPONITE™ by themselves (such as LAPONITE RD™). The coating preferably forms at least one layer of nanoparticles on the surface which has been coated, and is substantially uniform.

It has also been found that when the treating composition comprises certain surfactants, a more suitable coating is formed than when using other surfactants. The coating formed thereby is much less effected by the weather conditions. The use of the preferred types of surfactants described herein, such as MIN-FOAM™ surfactant, also provides a suitable surface coating using using a much lesser amount of non-photoactive nanoparticles, as well as a lesser amount of the sufactant. The reduction in the amount of non-photoactive nanoparticles may approach one-half of the amount of non-photoactive nanoparticles that must be used with other types of surfactants. The MIN-FOAM™ surfactant uses up to 15% less surfactant to deliver the LAPONITE B™ to the surface. Without wishing to be bound to any particular theory, this is believed to be due to the low CMC of the MIN-FOAM™ surfactant. Additionally, the MIN-FOAM™ surfactant produces less visible residue due to lower suds generating when the composition is delivered to the substrate using a sprayer.

In one non-limiting embodiment, the treating composition is applied directly to the surface of the vehicle using a cloth, sponge, or foam squeegie. A treating composition comprising about 0.055% of nanoparticles can be applied directly to the surface of the vehicle in this manner. The painted surfaces and windows of an average size car can be coated with approximately 300 ml of such a treating composition.

In another non-limiting embodiment, the treating composition is sprayed onto the surface of the vehicle. The treating composition can be applied using a spraying device, such as the sprayer shown in the drawings. The spraying device can be set on the "finishing coating" setting. Alternatively, a separate sprayer can be used. If a end of the hose type sprayer is used, the treating composition is sprayed onto the surface of the vehicle at a flow rate that is less than or equal to about 8 gal./min. (about 30 L/min), or any flow rate less than that flow rate. Regardless of the type of sprayer used, in certain other non-limiting embodiments, the treating composition is sprayed onto the surface of the vehicle at a flow rate of less than or equal to about 0.1 gal./min. (about 0.38 L/min.), preferably less than or equal to about 0.05 gal./min. (about 0.19 L/min.). It has been found that the painted surfaces and windows of an average size car can be coated with approximately 1 L to 1.5 L of such a coating composition using a spraying method.

F. Forming a Wet Film of Nanoparticles

The preceding step preferably forms a substantially uniform wet aqueous film comprising a plurality of nanoparticles, on the surface of the vehicle. Uniform coverage of the surface is desired in order to provide the benefits described herein to the entire surface to be treated.

The wet film should be capable of drying to a dry state. Between the wet state and the dry state, the film will typically pass through various partially dried states. In order to form a dry film that has the desired uniform characteristics described herein, the wet film should be as free as possible from film imperfection-producing substances as possible. Therefore, a step in the process may include at least partially removing imperfection-producing substances from the surface to be coated and from the wet film. Such imperfection-producing substances may include, but are not limited to deposits which can be left by tap water, air bubbles, etc. The wet film should preferably be spread uniformly across the surface, and should not develop breaks in the uniformity during the drying process.

Air bubbles in the wet film can, in certain circumstances, cause serious defects in the finally-formed dry film. If the air bubbles are of a relatively small size (e.g., in some cases less than 4 mm), or if they break while the wet film is still in a partially dried state, this can minimize defects in the dry film. When air bubbles break when the wet film is still in a sufficiently early partially dried state, the adjacent portions of the wet film can flow into the openings created when the air bubbles break, and fill the same to eliminate any gaps in the dry film. Therefore, the wet film is preferably substantially free of air bubbles that break after the wet film is in a partially dried state. For this reason, it is desirable, when spraying the coating composition on the surfaces, to select a type of sprayer that will minimize the quantity and size of air bubbles in the wet film.

G. Allowing the Treating Composition to Dry on the Surface of the Vehicle Before the Surface of the Vehicle is Contacted by Water to Form a Dry Film on the Surface of the Vehicle The surface of the vehicle with the treating composition thereon should preferably be allowed to dry after the application of the treating composition. The surface should be allowed to dry without agitation, scrubbing, buffing, or otherwise disturbing the treated surface (that is, the wet film). The wet film on the surface of the vehicle should be allowed to dry for at least about 15 minutes, preferably at least about one-half hour, more preferably at least about 2 hours, more preferably still at least about 4 hours, and most preferably up to about 24 hours before any water contacts the treated surface of the vehicle.

After drying, the coating composition forms a dry film on the surface of the vehicle. The coating preferably forms a dry film comprising at least one layer of nanoparticles on the surface which has been coated, and is substantially uniform. Preferably, the dry film has a thickness of less than or equal to about 400 nm, more preferably less than or equal to about 300 nm, and most preferably, less than or equal to about 200 nm. Thinner dry films will typically have better transparency. Preferably, the dry film comprises primarily nanoparticles, and some remaining amounts of water and, in some cases, surfactant. The dry film can have any suitable amount of nanoparticles therein. Preferably, the dry film has a sufficient amount of nanoparticles to provide the surface of the vehicle with the desired hydrophilicity. Preferably, the dry film comprises non-photoactive nanoparticles in an amount greater than or equal to about 0.2 ug/cm$^2$ of the surface area treated. The dry film can provide the composite surface (or coated surface) with any suitable degree of hydrophilicity described herein. In preferred embodiments, the contact angle of distilled water on the dry film is less than or equal to about 25°, preferably less than or equal to about 20°, and more preferably less than or equal to about 15°.

The system and method of the present invention is well suited for use by consumers in hand washing and finishing automobiles. In such a case, the coating composition will typically be applied to the surfaces of the vehicle by spraying of the coating composition in a sequential manner onto limited areas or regions of the surfaces (or by applying the coating composition onto such limited areas of the surface by other means) until the entire surface of the vehicle is covered. The system and method of the present invention provides a durable, transparent, residue-free, hydrophilic nanoparticle film coating that covers the entire surface of the car (or any desired portions thereof). The film coating is not subject to spotting after being contacted repeatedly with water (such as rain water). There is no need to wax (and buff) vehicles that are treated by this method. In addition, the system and method of the present invention can be adapted to be used in commercial operations, including but not limited to car washes. The system and method may also be used to provide at least a temporary coating on new and other vehicles for shipment from the manufacturer to their final destination.

EXAMPLE(S)

The following provides several non-limiting examples of the present invention.

Examples 1–29

Liquid coating compositions, according to the present invention, are as follows where the balance is water:

TABLE 1

| Example # | Nanoparticle (Wt %) | Surfactant (Wt %) |
|---|---|---|
| 1 | Nanoclay[1] (0.055) | Minfoam 1 × (0.042) |
| 2 | Nanoclay (0.1) | Minfoam 1 × (0.075) |
| 3 | Nanoclay (0.1) | Minfoam 2 × (0.075) |
| 4 | Nanoclay (0.1) | Minfoam 2 × (0.03) |
|   |   | Minfoam 1 × (0.03) |
| 5 | Nanoclay (0.1) | Neodol 91-6 (0.075) |
| 6 | Nanoclay (0.05) | Neodol 91-6 (0.075) |
| 7 | Nanoclay (0.1) | Neodol 91-2.5 (0.075) |
| 8 | Nanoclay (0.1) | Neodol 91-5 (0.075) |
| 9 | Nanoclay (0.1) | Neodol 91-8 (0.075) |
| 10 | Nanoclay (0.05) | Silwet L-77 (0.025) |
| 11 | Nanoclay (0.1) | Q2-5211 (0.025) |
| 12 | Nanoclay (0.05) | Q2-5211 (0.025) |
| 13 | Nanoclay (0.03) | Q2-5211 (0.1) |
| 14 | Nanoclay (0.05) | Q2-5212 (0.05) |
| 15 | Nanoclay (0.1) | Q2-5212 (0.05) |
| 16 | Nanoclay (0.1) | Tergitol 15-S-3 (0.075) |
| 17 | Nanoclay (0.1) | Tergitol 15-S-7 (0.075) |
| 18 | Nanoclay (0.1) | Tergitol 15-S-9 (0.1) |
| 19 | Nanoclay (0.1) | Tergitol NP-9 (0.1) |
| 20 | Nanoclay (0.1) | Tergitol TMN-6 (0.075) |
| 21 | Nanoclay (0.1) | Neodol 91-8 (0.075) |
| 22 | Nanoclay (0.1) | Component A (0.2) |
| 23 | Nanoclay (0.2) | Component A (0.2) |
| 24 | Nanoclay (0.1) | Component B (0.2) |
| 25 | Nanoclay (0.1)[2] | Neodol 91-6 (0.075) |
| 26 | Disperal P2 ™ (0.1)[3] | Neodol 91-6 (0.075) |
| 27 | Nanoclay (0.1) | APG[4] (0.05) |
| 28 | Nanoclay (0.1) | Butyl capped poly(oxyalkylated) alcohol (0.075) |
| 29 | Nanoclay (0.1) | Ether capped poly(oxyalkylated) alcohol (0.075) |

[1]Nanoclay can be any of the available synthetic hectorite clays, such as LAPONITE ™ available from Southern Clay Products, Inc. One preferred grade of LAPONITE ™ is LAPONITE B ™, a sodium magnesium lithium flurosilicate.
[2]One preferred grade of LAPONITE ™ for this example is LAPONITE RD ™.
[3]Disperal P2 ™ is boehmite alumina from Condea, Inc.
[4]APG is alkyl-polyglucoside.

Examples 30–33

In the following examples, dispersants are formulated with the nanoclay and surfactant to allow the coating composition to be made with tap water:

TABLE 2

| Ex- ample # | Nanoparticle (Wt %) | Surfactant (Wt %) | Dispersant (Wt %) |
|---|---|---|---|
| 30 | Nanoclay (0.1) | Neodol 91-6 (0.075) | Polyacrylate 4500 MW (0.02) |
| 31 | Nanoclay (0.1) | Neodol 91-6 (0.075) | Poly (acrylic/maleic)[2] (0.02) |
| 32 | Nanoclay (0.1) | Neodol 91-6 (0.075) | Polyacrylate 2000 MW (0.02) |
| 33 | Nanoclay (0.1) | Neodol 91-6 (0.075) | STPP (0.02) |

[1]Nanoclay can be any of the available synthetic hectorite clays, such as LAPONITE B ™ from Southern Clay Products, Inc.
[2]MA:AA = 4:6, MW (molecular weight) = 11,000.

Examples 34–42

Liquid coating compositions, according to the present invention, where the balance is water, and where said coating composition can be applied to a surface, or optionally where the coating composition can be diluted with water to achieve a coating composition with 0.1% concentration of nanoparticles are as follows:

TABLE 3

| Ex- ample # | Nanoparticle (Wt %) | Surfactant (Wt %) | Dispersant (Wt %) |
|---|---|---|---|
| 34 | Nanoclay (0.55) | Minfoam 1 × (0.42) | None |
| 35 | Nanoclay (1.6) | Q2-5211 (0.8) | None |
| 36 | Nanoclay (0.8) | Q2-5211 (0.4) | None |
| 37 | Nanoclay (0.8) | Neodol 91-6 (0.6) | None |
| 38 | Disperal P2 ™ (10) | Neodol 91-6 (7.5) | None |
| 39 | Nanoclay (5.0) | Neodol 91-6 (3.75) | Polyacrylate 4500 MW (1.0) |
| 40 | Nanoclay (5.0) | Neodol 91-6 (3.75) | Poly (acrylic/maleic)[3] (1.0) |
| 41 | Nanoclay (1.0) | Neodol 91-6 (0.75) | Polyacrylate 4500 MW (0.2) |
| 42 | Nanoclay (1.0) | Neodol 91-6 (0.75) | Polyacrylate 4500 MW (0.1) |

[1]Nanoclay can be any of the available synthetic hectorite clays, such as LAPONITE ™ available from Southern Clay Products, Inc.
[2]Disperal P2 ™ is boehmite alumina from Condea, Inc.
[3]MA:AA = 4:6, MW = 11,000.

The present invention is not limited to methods that include steps for both cleaning and treating surfaces. For instance, in another non-limiting example, the method of the present invention can comprise only the steps for treating the surface. Any portions or steps of the method described herein may comprise inventions in their own right without regard to the other steps described herein.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A method of forming a transparent, hydrophilic coating on the surface of a vehicle, said method comprising the steps of:
    (a) providing a vehicle having surfaces at least some of which surfaces are selected from the group consisting of: cured painted surfaces, cured clearcoat surfaces, and glass surfaces;
    (b) applying a coating composition to the at least some of which surfaces described in step (a), said coating composition comprising a non-photoactive inorganic nanoparticle composition wherein said coating composition forms a wet film on said surfaces, said wet film being capable of drying from a partially dried state to a dried slate to form a (by film, said wet film being free of at least some film imperfection producing elements; and
    (c) allowing the coating composition to dry on said surfaces before said surfaces are contacted by water.

2. The method of claim 1 wherein said coating composition is applied to the surfaces in step (b) by applying the coating composition onto the surface of an article, and contacting said surfaces in step (b) with the coated surfaces of said article.

3. The method of claim 1 wherein said coating composition is applied directly onto the surfaces in step (b) by pouring the coating composition onto said surfaces.

4. The method of claim 1 wherein said coating composition is applied to the surfaces in step (b) by spraying the coating composition onto said surfaces.

5. The method of claim 4 wherein the film imperfection producing elements comprise air bubbles that break after said wet film is in a partially dried state.

6. The method of claim 4 wherein the coating composition is sprayed onto the surface of the vehicle at a flow rate of less than or equal to about 8 gal./min.

7. The method of claim 1 wherein at least some of said non-photoactive nanoparticles contain fluorine.

8. The method of claim 1 wherein at least some of said non-photoactive nanoparticles have a mole ratio of magnesium oxide to lithium oxide content of less than about 11%.

9. The method of claim 1 wherein the wet film formed in step (b) dries to a dry film in step (c), and said dry film comprises non-photoactive nanoparticles in an amount of greater than or equal to about 0.2 $\mu g/cm^2$.

10. The method of claim 1 wherein the contact angle of distilled water on said dry film is less than or equal to about 25°.

11. The method of claim 1 wherein said coating composition further comprises a wetting agent.

12. The method of claim 11 wherein said wetting agent comprises a nonionic surfactant.

13. The method of claim 12 wherein the static surface tension of the liquid-vapor interface for a 0.1% surfactant solution containing the surfactant and the vapor above such a solution is less than about 32 dynes/cm.

14. The method of claim 12 wherein the critical micelle concentration (CMC) of said nonionic surfactant is less than about 650 ppm.

15. The method of claim 12 wherein said nonionic surfactant has a cloud point of less than or equal to about 40° C.

16. The method of claim 12 wherein the nonionic surfactant is selected from the group consisting of: ethylene oxide, propylene oxide, and mixtures thereof, primary aliphatic alcohols, secondary aliphatic alcohols, and mixtures thereof.

17. The method of claim 1 wherein the coating composition applied in step (b) forms a film of non-photoactive nanoparticles having a thickness of less than or equal to about 400 nanometers.

18. The method of claim 1 wherein in step (c), the surface of the vehicle is allowed to dry for at least about 15 minutes before any water contacts the treated surface.

* * * * *

UNITED STATES PATENT AND TRADEMARK OFFICE
CERTIFICATE OF CORRECTION

PATENT NO. : 6,846,512 B2 Page 1 of 1
DATED : January 25, 2005
INVENTOR(S) : Rohrbaugh et al.

It is certified that error appears in the above-identified patent and that said Letters Patent is hereby corrected as shown below:

<u>Title page,</u>
Item [62], Related U.S. Application Data, should read:
-- Continuation-in-part of application No. 09/875,311, filed as application No. PCT/US00/16349 on Jun. 14, 2000, and a continuation-in-part of application No. 09/876,363, filed on June 7, 2001, and a continuation-in-part of application No. 09/828,014, filed on Apr. 6, 2001, and a provisional application No. 60/265,059, filed on 1/30/2001. --

Signed and Sealed this

Seventeenth Day of May, 2005

JON W. DUDAS
*Director of the United States Patent and Trademark Office*